United States Patent
Tazaki et al.

(10) Patent No.: US 10,000,045 B2
(45) Date of Patent: Jun. 19, 2018

(54) MULTILAYER TUBE FOR FUEL TRANSPORTATION, FUEL PUMP MODULE PROVIDED WITH SAME, USE OF SAME, AND USE OF FUEL PUMP MODULE

(71) Applicant: KURARAY CO., LTD., Kurashiki-shi (JP)

(72) Inventors: Go Tazaki; Hideaki Suzuki, Tsukuba (JP); Toshiaki Hasegawa, Tsukuba (JP)

(73) Assignee: KURARAY CO., LTD., Kurashiki-shi (JP)

(*) Notice: Subject to any disclaimer, the term of this patent is extended or adjusted under 35 U.S.C. 154(b) by 0 days. days.

(21) Appl. No.: 15/558,822

(22) PCT Filed: Mar. 9, 2016

(86) PCT No.: PCT/JP2016/057439
§ 371 (c)(1),
(2) Date: Sep. 15, 2017

(87) PCT Pub. No.: WO2016/152537
PCT Pub. Date: Sep. 29, 2016

(65) Prior Publication Data
US 2018/0079190 A1     Mar. 22, 2018

(30) Foreign Application Priority Data

Mar. 20, 2015 (JP) ................. 2015-057302

(51) Int. Cl.
| | | |
|---|---|---|
| *B32B 27/34* | (2006.01) | |
| *B32B 1/08* | (2006.01) | |
| *B32B 27/08* | (2006.01) | |
| *F02M 37/00* | (2006.01) | |
| *F16L 11/12* | (2006.01) | |
| *F02M 37/04* | (2006.01) | |

(52) U.S. Cl.
CPC ................ *B32B 27/34* (2013.01); *B32B 1/08* (2013.01); *B32B 27/08* (2013.01); *F02M 37/0017* (2013.01); *F16L 11/125* (2013.01); *B32B 2250/03* (2013.01); *B32B 2250/40* (2013.01); *B32B 2307/546* (2013.01); *F02M 37/04* (2013.01)

(58) Field of Classification Search
CPC ........... B32B 27/34; B32B 1/08; B32B 27/08; B32B 2250/03; B32B 2250/40; B32B 2307/546; F02M 37/0017; F02M 37/04; F16L 11/125
See application file for complete search history.

(56) References Cited

U.S. PATENT DOCUMENTS

| | | |
|---|---|---|
| 2009/0098325 A1 | 4/2009 | Uchida et al. |
| 2014/0246096 A1 | 9/2014 | Blondel et al. |

FOREIGN PATENT DOCUMENTS

| | | |
|---|---|---|
| JP | 2008-88824 A | 4/2006 |
| JP | 2009-298858 A | 12/2009 |
| JP | 2014-240149 A | 12/2014 |
| JP | 2015-501341 A | 1/2015 |
| WO | 2005-102681 A1 | 11/2005 |
| WO | 2006/098434 A1 | 9/2006 |

OTHER PUBLICATIONS

International Search Report dated May 17, 2016, in PCT/JP2016/057439 filed Mar. 9, 2016.

*Primary Examiner* — Michael C Miggins
(74) *Attorney, Agent, or Firm* — Oblon, McClelland, Maier & Neustadt, L.L.P.

(57) ABSTRACT

A multilayered tube for transporting fuel including an innermost layer (A), an outermost layer (B) and an intermediate layer (C), characterized by that: the innermost layer (A) and the outermost layer (B) include a resin composition including 40 mass % or more of semi-aromatic polyamide; a flexural modulus of a material constituting the intermediate layer (C) measured according to ISO 178 is 800 MPa or less; and it is used in an environment in which both the innermost layer (A) and the outermost layer (B) are contacted with biodiesel fuel. In addition, a fuel pump module including the multilayered tube for transporting fuel and a method for using them.

11 Claims, No Drawings

MULTILAYER TUBE FOR FUEL TRANSPORTATION, FUEL PUMP MODULE PROVIDED WITH SAME, USE OF SAME, AND USE OF FUEL PUMP MODULE

TECHNICAL FIELD

The present invention relates to a tube for transporting fuel, fuel pump modules, and a method for using them. More specifically, the present invention relates to a multilayered tube for transporting fuel which hardly generates a crack even when inserted into other members and is excellent in elongation properties and whose innermost layer and outermost layer are both excellent in biodiesel resistance, and relates to a fuel pump module comprising the multilayered tube for transporting fuel and a method for using them.

BACKGROUND ART

In a fuel pump module which is accommodated in a fuel tank of automobiles and the like and plays a role of supplying fuel to an internal-combustion engine, a large part of the tubes for transporting fuel mounted in the module is immersed into fuel in the fuel tank (for example, cf. PTL 1). Therefore, in the tube for transporting fuel, both its innermost layer and outermost layer are directly contacted with the fuel, and fuel resistance is required for both sides. Hence, for the tube for transporting fuel, a resin composition containing resin such as polyamide 11 and polyamide 12, which is excellent in fuel resistance and a fuel penetration preventing property, is used.

In recent years, from the viewpoint of reduction in greenhouse gases, fuel derived from biomass has begun to be used for fuel of automobiles and the like. In diesel engine vehicles, fuel containing FAME (Fatty Acid Methyl Ester) obtained by transesterifying vegetable oil with methanol to separate and remove glycerol is used as a "biodiesel fuel". Examples of FAME include mixed fatty acid methyl ester containing unsaturated fatty acid methyl ester, etc. such as RME (Rapeseed Methyl Ester) derived from rapeseed oil, SME (Soybean Methyl Ester) derived from soybean, SFME (Sunflower Methyl Ester) derived from sunflower oil, PME (Palm Methyl Ester) derived from palm oil, and JME derived from jatropha oil (Jatropha Methyl Ester).

However, the fuel containing FAME containing unsaturated fatty acid methyl ester easily generates decomposed matters such as peroxides, carboxylic acid, alcohols, ketones and aldehydes by oxidization of a double bond portion or hydrolysis of an ester bond. These decomposed matters cause degradation of a resin composition in contact with fuel. Therefore, the resistance required for the resin composition in contact with biodiesel fuel is essentially different from resistance of conventional fuels such as gasoline and light oil, and a resin composition which is conventionally regarded as being excellent in fuel resistance cannot be always applied as it is.

PTL 2 discloses that a molding member comprising polyamide resin, in which: a dicarboxylic acid component comprises oxalic acid; a diamine component comprises 1,9-nonanediamine and 2-methyl 1,8-octanediamine; and a molar ratio of 1,9-nonanediamine and 2-methyl 1,8-octanediamine is 1:99 to 99:1, is excellent in biodiesel resistance and the like. However, when the molding member is a tube, elongation properties are inferior and a crack may occur when inserted into other members such as a quick connector.

PTL 3 discloses that a multilayer hose for transporting high-temperature liquid and/or gas chemicals comprising a layer comprising an aliphatic polyamide and a layer comprising a semi-aromatic polyamide having a specific structure is excellent in chemical resistance. However, it is not assumed that the multilayer hose is used in the environment in which both its innermost layer and outermost layer are contacted with biodiesel fuel.

CITATION LIST

Patent Literature

PTL 1: JP 2008-88824 A
PTL 2: JP 2009-298858 A
PTL 3: WO 2005-102681 A

SUMMARY OF INVENTION

Technical Problem

When biodiesel fuel is used, in a tube in which both its inside and outside are directly contacted with fuel like a tube for transporting fuel mounted in a fuel pump module, high biodiesel fuel resistance is required on both sides, and it is required that a crack is hardly generated also when inserted into other members such as a quick connector and that elongation properties are excellent.

In view of the above circumstances, an object of the present invention is to provide a multilayered tube for transporting fuel which is excellent in the above properties, a fuel pump module comprising the multilayered tube for transporting fuel and a method for using them.

Solution to Problem

The present inventors have found that the above object can be achieved when the innermost layer, outermost layer, and intermediate layer of the multilayered tube for transporting fuel are constituted by a resin composition satisfying specific conditions.

Specifically, the present invention relates to the following [1] to [11].
[1] A multilayered tube for transporting fuel comprising an innermost layer (A), an outermost layer (B), and an intermediate layer (C), wherein the innermost layer (A) and the outermost layer (B) comprise a resin composition comprising 40 mass % or more of semi-aromatic polyamide; a flexural modulus of a material constituting the intermediate layer (C) measured according to ISO 178 is 800 MPa or less; and the multilayered tube for transporting fuel is used in an environment in which both the innermost layer (A) and the outermost layer (B) are contacted with biodiesel fuel.
[2] The multilayered tube for transporting fuel according to the above [1], wherein a ratio of the number of amide groups to the number of carbon atoms of the semi-aromatic polyamide is 0.070 to 0.170.
[3] The multilayered tube for transporting fuel according to the above [1] or [2], wherein an amount of heat of crystal fusion (ΔHm) of the semi-aromatic polyamide is 30 J/g or more.
[4] The multilayered tube for transporting fuel according to any one of the above [1] to [3], wherein a glass transition temperature of the semi-aromatic polyamide is 80° C. or more.
[5] The multilayered tube for transporting fuel according to any one of the above [1] to [4], wherein the semi-aromatic polyamide comprises: a dicarboxylic acid unit comprising 50 to 100 mol % of at least one selected from the group consisting of a terephthalic acid unit and a naphthalene dicarboxylic acid unit; and a diamine unit comprising 60 to 100 mol % of an aliphatic diamine unit having 4 to 18 carbon atoms.

[6] The multilayered tube for transporting fuel according to any one of the above [1] to [5], wherein the intermediate layer (C) does not comprise an aliphatic polyamide.

[7] The multilayered tube for transporting fuel according to any one of the above [1] to [6], wherein the biodiesel fuel is biodiesel fuel comprising 20 mass % or more of FAME.

[8] A method for using a multilayered tube for transporting fuel comprising an innermost layer (A), an outermost layer (B), and an intermediate layer (C), wherein the innermost layer (A) and the outermost layer (B) comprise a resin composition comprising 40 mass % or more of semi-aromatic polyamide; a flexural modulus of a material constituting the intermediate layer (C) measured according to ISO 178 is 800 MPa or less; and the multilayered tube for transporting fuel is used in an environment in which both the innermost layer (A) and the outermost layer (B) are contacted with biodiesel fuel.

[9] A fuel pump module comprising the multilayered tube for transporting fuel according to any one of the above [1] to [6], wherein both the innermost layer (A) and the outermost layer (B) of the multilayered tube for transporting fuel are contacted with biodiesel fuel.

[10] The fuel pump module according to the above [9], wherein the biodiesel fuel is biodiesel fuel comprising 20 mass % or more of FAME.

[11] A method for using a fuel pump module comprising the multilayered tube for transporting fuel according to any one of the above [1] to [6], wherein the fuel pump module is used in an environment in which both the innermost layer (A) and the outermost layer (B) of the multilayered tube for transporting fuel are contacted with biodiesel fuel.

Advantageous Effects of Invention

The present invention can provide: a multilayered tube for transporting fuel, in which a crack is hardly generated even when inserted into other members, and elongation properties are excellent, and the innermost and outermost layers are both excellent in biodiesel fuel resistance: a fuel pump module comprising the multilayered tube for transporting fuel; and a method for using them.

DESCRIPTION OF EMBODIMENTS

[Multilayered Tube for Transporting Fuel]

The multilayered tube for transporting fuel according to the present invention comprising an innermost layer (A), an outermost layer (B), and at least an intermediate layer (C), wherein the innermost layer (A) and the outermost layer (B) comprise a resin composition containing 40 mass % or more of semi-aromatic polyamide; a flexural modulus measured according to ISO 178 of a material which constitutes the intermediate layer (C) is 800 MPa or less; and the multilayered tube for transporting fuel is used in an environment in which both the innermost layer (A) and the outermost layer (B) are contacted with biodiesel fuel.

In the present invention, biodiesel fuel refers to fuel containing FAME such as RME, SME, SFME, PME and JME. Since especially high level of resistance is required in biodiesel fuel containing 20 mass % or more of FAME, it is preferable that the multilayered tube for transporting fuel of the present invention be applied to the environment of contacting with biodiesel fuel containing 20 mass % or more of FAME.

Hereinafter, the present invention will be described in more detail.

{Innermost Layer (A) and Outermost Layer (B)}
(Semi-Aromatic Polyamide)

The innermost layer (A) and the outermost layer (B) of the multilayered tube for transporting fuel of the present invention comprise a resin composition containing 40 mass % or more of semi-aromatic polyamide.

The semi-aromatic polyamide as used in the present invention refers to a polyamide comprising a dicarboxylic acid unit essentially comprising an aromatic dicarboxylic acid unit and a diamine unit essentially comprising an aliphatic diamine unit, or a polyamide comprising a dicarboxylic acid unit essentially comprising an aliphatic dicarboxylic acid unit and a diamine unit essentially comprising an aromatic diamine unit. Here, "essentially comprising" refers to constituting 50 to 100 mol %, preferably 60 to 100 mol % in all the units of dicarboxylic acid units and refers to 50 to 100 mol %, preferably 60 to 100 mol % in all the units of diamine units.

In the semi-aromatic polyamide, a preferable one is a polyamide comprising a dicarboxylic acid unit essentially comprising an aromatic dicarboxylic acid unit and a diamine unit essentially comprising an aliphatic diamine unit, and more preferable one is a semi-aromatic polyamide comprising: a dicarboxylic acid unit comprising 50 to 100 mol % of at least one selected from the group consisting of a terephthalic acid unit and a naphthalene dicarboxylic acid unit; and a diamine unit comprising 60 to 100 mol % of an aliphatic diamine unit having 4 to 18 carbon atoms.

The total amount of the dicarboxylic acid unit and the diamine unit constituting the semi-aromatic polyamide is preferably 60 mol % or more, more preferably 80 mol % or more, further preferably 90 mol % or more, based on 100 mol % of the total monomer units constituting the semi-aromatic polyamide.

Hereinafter, the semi-aromatic polyamide will be described in more detail.

The dicarboxylic acid unit constituting the semi-aromatic polyamide preferably has a content of at least one selected from the group consisting of a terephthalic acid unit and a naphthalene dicarboxylic acid unit of 50 to 100 mol %. Thereby, not only biodiesel fuel resistance of the innermost and outermost layers of the obtained multilayered tube for transporting fuel but also heat resistance and barrier properties of these layers to decomposed matters and fuel components of FAME will be improved. The content of one selected from the group consisting of a terephthalic acid unit and a naphthalene dicarboxylic acid unit in the dicarboxylic acid unit is more preferably in the range of 75 to 100 mol %, further preferably in the range of 90 to 100 mol %.

Examples of the naphthalene dicarboxylic acid unit include those derived from 2,6-naphthalene dicarboxylic acid, 2,7-naphthalene dicarboxylic acid, and 1,4-naphthalene dicarboxylic acid, and 2,6-naphthalene dicarboxylic acid unit is preferred.

Further, the dicarboxylic acid unit is more preferably a terephthalic acid unit.

The dicarboxylic acid unit constituting the semi-aromatic polyamide may comprise other dicarboxylic acid units other than the terephthalic acid unit and the naphthalene dicarboxylic acid unit. Examples of these other carboxylic acid units include the units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 1,4-phenylenedioxy diacetic acid, 1,3-phenylenedioxy diacetic acid, diphenic acid, diphenylmethane-4, 4'-dicarboxylic acid, diphenylsulfone-4,4'-dicarboxylic acid, and 4,4'-biphenyl dicarboxylic acid. Other carboxylic acid units may comprise these units singly or in combination. The content of these other dicarboxylic acid units in the dicarboxylic acid unit is preferably 50 mol % or less, more preferably 25 mol % or less, further preferably 10 mol % or less. Further, the dicarboxylic acid unit may comprise the units derived from polyvalent carboxylic acids such as trimellitic acid, trimesic acid, and pyromellitic acid in the range where melt molding is possible.

Moreover, it is preferable that the diamine unit constituting semi-aromatic polyamide contain 60 to 100 mol % of an aliphatic diamine unit having 4 to 18 carbon atoms from the viewpoint of toughness, slidability, heat resistance, moldability, low water absorption properties, and lightweight properties of the innermost and outermost layers. The content of the aliphatic diamine unit having 4 to 18 carbon atoms in the diamine unit is more preferably in the range of 75 to 100 mol %, further preferably in the range of 90 to 100 mol %.

Examples of the above aliphatic diamine unit having 4 to 18 carbon atoms include the units derived from linear aliphatic diamines such as 1,4-butanediamine, 1,5-pentanediamine, 1,6-hexanediamine, 1,7-heptanediamine, 1, 8-octanediamine, 1, 9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, and 1,18-octadecanediamine; and branched aliphatic diamines such as 2-methyl-1,3-propanediamine, 2-methyl-1,4-butanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine. The aliphatic diamine unit having 4 to 18 carbon atoms may comprise these units singly or in combination.

The above aliphatic diamine unit having 4 to 18 carbon atoms is preferably an aliphatic diamine unit having 6 to 18 carbon atoms, and more preferably at least one selected from the group consisting of a 1,9-nonanediamine unit and a 2-methyl-1,8-octanediamine unit, further preferably a 1,9-nonanediamine unit and a 2-methyl-1,8-octanediamine unit, since innermost and outermost layers which are further excellent in biodiesel fuel resistance are obtained. When the diamine unit comprises both the 1,9-nonanediamine unit and the 2-methyl-1,8-octanediamine unit, the molar ratio of the 1,9-nonanediamine unit to the 2-methyl-1,8-octanediamine unit is preferably in the range of 1,9-nonanediamine unit/2-methyl-1,8-octanediamine unit=95/5 to 40/60, more preferably in the range of 90/10 to 40/60, and further preferably in the range of 85/15 to 40/60.

The diamine unit constituting the semi-aromatic polyamide may comprise other diamine units other than the aliphatic diamine unit having 4 to 18 carbon atoms. Example of these other diamine units include the units derived from aliphatic diamines such as ethylenediamine, 1,2-propanediamine, and 1,3-propanediamine; alicyclic diamines such as cyclohexanediamine, methylcyclohexanediamine, and isophoronediamine; and aromatic diamines such as p-phenylenediamine, m-phenylenediamine, xylylenediamine, 4,4'-diaminodiphenylmethane, 4,4'-diaminodiphenyl sulfone, and 4,4'-diaminodiphenyl ether. Other diamine units may comprise these units singly or in combination. The content of these other diamine units in the diamine unit is preferably 40 mol % or less, more preferably 25 mol % or less, and further preferably 10 mol % or less.

The semi-aromatic polyamide may comprise an aminocarboxylic acid unit as long as the advantageous effects of the present invention are not impaired. Examples of the aminocarboxylic acid unit include the units derived from 11-aminoundecanoic acid, 12-aminododecanoic acid, and the like, and the aminocarboxylic acid unit may be contained in combination. The content of the aminocarboxylic acid unit in the semi-aromatic polyamide is preferably 40 mol % or less, more preferably 20 mol % or less, and further preferably 10 mol % or less, based on 100 mol % of the total monomer units constituting the semi-aromatic polyamide.

The semi-aromatic polyamide may comprise a lactam unit as long as the advantageous effects of the present invention are not impaired. Examples of the lactam unit include the units derived from ε-caprolactam, enantholactam, undecanelactam, lauryllactam, α-pyrrolidone, α-piperidone, and the like, and the lactam unit may be contained in combination. The content of the lactam unit in the semi-aromatic polyamide is preferably 40 mol % or less, more preferably 20 mol % or less, and further preferably 10 mol % or less, based on 100 mol % of the total monomer units constituting the semi-aromatic polyamide.

Of typical semi-aromatic polyamides which can be used in the present invention, examples of the typical semi-aromatic polyamide comprising the dicarboxylic acid unit essentially comprising the aromatic dicarboxylic acid unit and the diamine unit essentially comprising the aliphatic diamine unit include polyhexamethylene terephthalamide (polyamide 6T), polynonamethylene terephthalamide (polyamide 9T), polydecamethylene terephthalamide (polyamide 10T), polyhexamethylene isophthalamide (polyamide 6I), a copolymer of polyamide 6I and polyamide 6T (polyamide 6I/6T), and a copolymer of polyamide 6T and polyundecanamide (polyamide 11) (polyamide 6T/11).

On the other hand, among the semi-aromatic polyamides, with respect to the semi-aromatic polyamide comprising a dicarboxylic acid unit essentially comprising the aliphatic dicarboxylic acid unit and a diamine unit essentially comprising the aromatic diamine unit, examples of the aliphatic dicarboxylic acid unit include a unit derived from the aliphatic dicarboxylic acids described above. The aliphatic dicarboxylic acid unit may comprise these units singly or in combination. Further, examples of the aromatic diamine unit include a unit derived from the aromatic diamines described above. The aromatic diamine unit may comprise these units singly or in combination. Furthermore, these units may also comprise other units as long as the advantageous effects of the present invention are not impaired.

Of typical semi-aromatic polyamides which can be used in the present invention, examples of the typical semi-aromatic polyamides comprising a dicarboxylic acid unit essentially comprising the aliphatic dicarboxylic acid unit and a diamine unit essentially comprising the aromatic diamine unit include polymetaxylylene adipamide (MXD6) and a copolymer of p-xylylenediamine and sebacic acid (PXD10).

The semi-aromatic polyamide is preferably blocked with a terminal blocking agent at 10% or more of the terminal groups of the molecular chain. The proportion in which the terminal groups of the molecular chain are blocked with the terminal blocking agent (terminal blocking ratio) is more preferably 20% or more. When a semi-aromatic polyamide having a terminal blocking ratio of 10% or more is used, it is possible to prepare a resin composition for forming the innermost and outermost layers of the multilayered tube for transporting fuel superior in physical properties such as melting stability and hot water resistance.

The terminal blocking agent is not particularly limited as long as it is a monofunctional compound having reactivity with an amino group or a carboxyl group of polyamide terminals. A monocarboxylic acid or a monoamine is preferred from the viewpoint of reactivity thereof, stability of blocked terminals, and the like, and the monocarboxylic acid is more preferred from the viewpoint of ease of handling and the like. In addition, a monoisocyanate, a monoacid halide, monoesters, monoalcohols, and the like may also be used as the terminal blocking agent.

The monocarboxylic acid used as a terminal blocking agent is not particularly limited as long as it has reactivity with an amino group, and examples include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexane carboxylic acid; aromatic monocarboxylic acids such as benzoic acid, toluic acid, α-naphthalenecarboxylic acid, β-naphthalenecarboxylic acid, methylnaphthalene carboxylic acid, and phenylacetic acid; and any mixture thereof. Among them, acetic acid, propionic acid, butyric acid, valeric acid, caproic acid, caprylic acid, lauric acid, tridecanoic acid, myristic acid, palmitic acid, stearic acid, and benzoic acid are preferred from the viewpoint of reactivity thereof, stability of blocked terminals, price, and the like.

The monoamine used as a terminal blocking agent is not particularly limited as long as it has reactivity with a carboxyl group, and examples include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine; and any mixture thereof. Among them, butylamine, hexylamine, octylamine, decylamine, stearylamine, cyclohexylamine, and aniline are preferred from the viewpoint of reactivity thereof, boiling point, stability of blocked terminals, price, and the like.

The terminal blocking ratio of the semi-aromatic polyamide is determined according to the following equation (1) by measuring the number of carboxyl group terminals, amino group terminals, and terminal groups blocked with a terminal blocking agent which are present in the semi-aromatic polyamide, respectively. The number of each terminal group is preferably determined from the integrated value of characteristic signals corresponding to each terminal group by $^1$H-NMR from the viewpoint of accuracy and convenience.

$$\text{Terminal blocking ratio (\%)}=[(T-S)/T]\times 100 \quad (1)$$

wherein T represents the total number of terminal groups in the molecular chain of the semi-aromatic polyamide (this is usually equal to twice of the number of polyamide molecules); and S represents the sum number of carboxyl group terminals and amino group terminals remaining without being blocked.

The semi-aromatic polyamide can be produced by polycondensation reaction using any method known as a method for producing polyamide. For example, a polyamide comprising a dicarboxylic acid unit and a diamine unit can be produced by a method, such as a solution polymerization method or an interfacial polymerization method using an acid chloride and a diamine as raw materials, or a melt polymerization method, a solid-phase polymerization method, or a melt extrusion polymerization method using a dicarboxylic acid and a diamine as raw materials.

From the viewpoint of moldability and mechanical strength improvement, the molar ratio (dicarboxylic acid/diamine) of dicarboxylic acid and diamine which are provided to the polycondensation reaction is preferably 0.80 to 1.20, more preferably 0.90 to 1.10, further preferably 0.99 to 1.01.

When the semi-aromatic polyamide is produced, phosphoric acid, phosphorous acid, hypophosphorous acid, and a salt or an ester thereof may be added as a catalyst. Examples of the above salt or ester include a salt of phosphoric acid, phosphorous acid, or hypophosphorous acid with a metal such as potassium, sodium, magnesium, vanadium, calcium, zinc, cobalt, manganese, tin, tungsten, germanium, titanium, and antimony; an ammonium salt of phosphoric acid, phosphorous acid, or hypophosphorous acid; and ethyl ester, isopropyl ester, butyl ester, hexyl ester, isodecyl ester, decyl ester, stearyl ester, and phenyl ester of phosphoric acid, phosphorous acid, or hypophosphorous acid. Among them, sodium hypophosphite and phosphorous acid are preferred from the viewpoint of being less expensive and containing only a small amount of triamine.

The semi-aromatic polyamide preferably has an intrinsic viscosity [η] measured under a condition of 30° C. in a concentrated sulfuric acid in the range of 0.6 to 2.0 dl/g, more preferably in the range of 0.7 to 1.9 dl/g, and further preferably in the range of 0.8 to 1.8 dl/g. When a semi-aromatic polyamide having an intrinsic viscosity of 0.6 dl/g or more is used, the mechanical properties of the innermost and outermost layers of the multilayered tube for transporting fuel to be formed are improved. Further, when a semi-aromatic polyamide having an intrinsic viscosity of 2.0 dl/g or less is used, the resulting polyamide resin composition has excellent moldability.

The semi-aromatic polyamide preferably has a terminal amino group content ([NH$_2$]) of 5 to 60 μmol/g, more preferably in the range of 5 to 50 μmol/g, and further preferably in the range of 5 to 30 μmol/g. When the terminal amino group content ([NH$_2$]) is 5 μmol/g or more, in the case of containing an impact modifier described below in the resin composition, the compatibility between the semi-aromatic polyamide and the impact modifier is improved. Further, when the terminal amino group content is 60 μmol/g or less, a reduction in long-term heat resistance, a reduction in weld strength, and a reduction in conductivity in the case of containing the conductive filler described below in the resin composition may be avoided.

A semi-aromatic polyamide which comprises a dicarboxylic acid unit and a diamine unit and in which the terminal amino group content ([NH$_2$]) is in the range described above can be produced, for example, in the following manner.

First, a dicarboxylic acid, a diamine, and optionally an aminocarboxylic acid, a lactam, a catalyst, and a terminal blocking agent are mixed to produce a nylon salt. At this time, when the number of moles (X) of all the carboxyl groups and the number of moles (Y) of all the amino groups contained in the above reaction raw materials satisfy the following equation (2), $$-0.5 \leq [(Y-X)/Y] \times 100 \leq 2.0 \quad (2)$$

a semi-aromatic polyamide having a terminal amino group content ([NH$_2$]) of 5 to 60 μmol/g will be easily produced, which is preferred. Next, the nylon salt produced is heated to a temperature of 200 to 250° C. to prepare a prepolymer having an intrinsic viscosity [η] at 30° C. in concentrated sulfuric acid of 0.10 to 0.60 dl/g, and the polymerization degree of the prepolymer can be further increased to thereby obtain a semi-aromatic polyamide used in the present invention. When the intrinsic viscosity [η] of the prepolymer is in the range of 0.10 to 0.60 dl/g, a deviation of the molar balance between carboxyl groups and amino groups and a reduction in the rate of polymerization will be small in the stage of increasing the polymerization degree, and there will be obtained a semi-aromatic polyamide which has a smaller molecular weight distribution and is more excellent in various types of performance and moldability. When the stage of increasing the polymerization degree is performed by a solid-phase polymerization method, the stage is preferably performed under reduced pressure or inert gas circulation, and when the polymerization temperature is in the range of 200 to 280° C., the solid-phase polymerization method has a high rate of polymerization, is excellent in productivity, and can effectively suppress discoloration and gelation. Further, when the stage of increasing the polymerization degree is performed by means of a melt extrusion machine, the polymerization temperature is preferably 370° C. or less. When the polymerization is performed under such a condition, almost no polyamide will be decomposed, and a semi-aromatic polyamide that is little degraded will be obtained.

Further, a semi-aromatic polyamide having a desired terminal amino group content ([NH$_2$]) can also be prepared by using plural types of polyamides each having a different terminal amino group content ([NH$_2$]) in combination.

The terminal amino group content ([NH$_2$]) as used herein means the amount of terminal amino groups (unit: μmol) contained in 1 g of semi-aromatic polyamide, and can be determined by neutralization analysis using an indicator.

In the semi-aromatic polyamide used in the present invention, a rate of the number of amide group (amide bond) to the number of carbon atoms ((hereinafter may be referred to as an "amide group concentration") is preferably 0.170 or less, more preferably 0.140 or less, further preferably 0.130 or less. The amide group concentration of 0.170 or less, which lowers the content of amide group serving as a starting point of decomposition, is advantageous because of further improving the resistance especially to an acid component in decomposed matters of FAME contained in biodiesel fuel.

Moreover, the amide group concentration is preferably 0.070 or more, more preferably 0.080 or more, further preferably 0.100 or more. The amide group concentration of 0.070 or more is advantageous since stiffness of the resin composition is improved and mechanical hardness and heat resistance become more excellent.

The amide group concentration is a value which is specifically calculated from {[number of amide groups in semi-aromatic polyamide]/[number of carbon atoms in semi-aromatic polyamide]}, and the number of amide groups does not contain an amide group which was produced by bonding with a terminal blocking agent.

The above [[number of amide groups in semi-aromatic polyamide]/[number of carbon atoms in semi-aromatic polyamide]} is calculated from [number of amide groups per repetition unit constituting semi-aromatic polyamide]/[number of carbon atoms per repetition unit constituting semi-aromatic polyamide]. When using any two or more kinds selected from the group consisting of a dicarboxylic acid unit and a diamine unit, [number of carbon atoms per repetition unit constituting semi-aromatic polyamide] is calculated by summing the number of carbon atoms of each dicarboxylic acid unit used or each diamine unit used multiplied by the molar ratio.

Moreover, when two or more semi-aromatic polyamides are mixed and used, the amide group concentration is calculated by summing amide group concentration of each semi-aromatic polyamide multiplied by its content (mass ratio).

In the semi-aromatic polyamide used in the present invention, the amount of heat of crystal fusion (ΔHm) obtained from DSC measurement is preferably 30 J/g or more, more preferably 40 J/g or more, further preferably 50 J/g or more. The amount of heat of crystal fusion (ΔHm) of 30 J/g or more is advantageous since crystallinity is high and dimensional stability and resistance to decomposed matters of FAME contained in biodiesel are further improved.

In the semi-aromatic polyamide used in the present invention, a glass transition temperature is preferably 80° C. or more, more preferably 90° C. or more, further preferably 100° C. or more. A glass transition temperature of 80° C. or more is advantageous since heat resistance and resistance to decomposed matters of FAME contained in biodiesel fuel are further improved.

The resin composition used for the innermost layer (A) and the innermost layer (B) of the present invention comprises 40 mass % of the above-mentioned semi-aromatic polyamide. The content of the semi-aromatic polyamide is preferably 60 mass % or more, more preferably 80 mass % or more, and further preferably 90 mass %, based on the resin composition.

As long as the advantageous effects of the present invention are not impaired, as needed, the resin composition may optionally comprise other components such as other resins than the above-mentioned semi-aromatic polyamide, an impact modifier, a conductive filler, other fillers than a conductive filler, a nucleating agent, a stabilizing agent to heat, light, or oxygen, a copper-based stabilizer, a coloring agent, an antistatic agent, a plasticizer, a lubricant, a flame retardant, and a flame retardant auxiliary agent, at a total amount of 60 mass % or less, preferably 40 mass % or less, more preferably 20 mass % or less, and further preferably 10 mass % or less.

(Other Resin)

Examples of other resins include an aliphatic polyamide resin such as polycaproamide (polyamide 6), polyhexamethylene adipamide (polyamide 66), polyundecanamide (polyamide 11), polydodecanamide (polyamide 12) and polyhexamethylene dodecamide (polyamide 612); a polyether resin such as polyacetal and polyphenylene oxide; a polysulfone resin such as polysulfone and polyethersulfone; a polythioether resin such as polyphenylene sulfide and polythioether sulfone; a polyketone resin such as polyether ether ketone and polyallyl ether ketone; a polynitrile resin such as polyacrylonitrile, polymethacrylonitrile, an acrylonitrile-styrene copolymer, an acrylonitrile-butadiene-styrene copolymer, and a methacrylonitrile-butadiene-styrene copolymer; a polymethacrylate resin such as polymethyl methacrylate and polyethyl methacrylate; a polyvinyl ester resin such as polyvinyl acetate; a polyvinyl chloride resin such as polyvinylidene chloride, polyvinyl chloride, a vinyl chloride-vinylidene chloride copolymer, and a vinylidene chloride-methyl acrylate copolymer; a cellulose resin such as cellulose acetate and cellulose butyrate; a fluororesin such as polyvinylidene fluoride, polyvinyl fluoride, an ethylene-tetrafluoroethylene copolymer, polychlorotrifluoroethylene, an ethylene-chlorotrifluoroethylene copolymer, a tetrafluoroethylene-hexafluoropropylene copolymer, and a tetrafluoroethylene-hexafluoropropylene-vinylidene fluoride copolymer; a polycarbonate resin; a polyimide resin such as thermoplastic polyimide, polyamideimide, and polyether imide; and a thermoplastic polyurethane resin.

(Impact Modifier)

When an impact modifier is contained in the resin composition used for the innermost layer (A) and the outermost layer (B), elongation properties of the multilayered tube for transporting fuel of the present invention becomes more excellent.

Examples of the impact modifier include a rubber-like polymer, which preferably has a flexural modulus measured according to ASTM D-790 of 500 MPa or less.

Specific examples include an α-olefin copolymer, an (ethylene and/or propylene)/(α,β-unsaturated carboxylic acid and/or unsaturated carboxylate) copolymer, ionomer, and an aromatic vinyl compound/conjugated diene compound block copolymer. These may be used singly or in combination.

Examples of the above α-olefin copolymer include a copolymer of ethylene and an α-olefin having 3 or more carbon atoms and a copolymer of propylene and an α-olefin having 4 or more carbon atoms.

Examples of the α-olefin having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. These may be used singly or in combination.

Further, polyenes such as non-conjugated dienes may be copolymerized, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinyl norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,5-norbornadiene. These may be used singly or in combination.

The above (ethylene and/or propylene)/(α,β-unsaturated carboxylic acid and/or unsaturated carboxylate) copolymer is a polymer obtained by copolymerizing at least one selected from ethylene and propylene and at least one selected from an α,β-unsaturated carboxylic acid and unsaturated carboxylate monomer; examples of the α,β-unsaturated carboxylic acid monomer include acrylic acid and methacrylic acid; and examples of the α,β-unsaturated carboxylate monomer include methyl ester, ethyl ester, propyl ester, butyl ester, pentyl ester, hexyl ester, heptyl ester, octyl ester, nonyl ester, and decyl ester, of these unsaturated carboxylic acids. These may be used singly or in combination.

The above ionomer is obtained by ionizing at least a part of the carboxyl groups of a copolymer of olefin and an α,β-unsaturated carboxylic acid by neutralization with a metal ion. Ethylene is preferably used as the olefin, and acrylic acid and methacrylic acid are preferably used as the α,β-unsaturated carboxylic acid. However, monomers are not limited to those illustrated here, and an unsaturated carboxylate monomer may be copolymerized. Further, examples of the metal ion include alkali metals and alkaline earth metals such as Li, Na, K, Mg, Ca, Sr, and Ba; and Al, Sn, Sb, Ti, Mn, Fe, Ni, Cu, Zn, and Cd. These may be used singly or in combination.

Further, the aromatic vinyl compound/conjugated diene compound block copolymer is a block copolymer comprising an aromatic vinyl compound polymer block and a conjugated diene polymer block, in which a block copolymer having at least one aromatic vinyl compound polymer block and at least one conjugated diene polymer block is used. Further, in the above block copolymer, an unsaturated bond in the conjugated diene polymer block may be hydrogenated.

The aromatic vinyl compound polymer block is a polymer block essentially comprising a structural unit derived from an aromatic vinyl compound. Examples of the aromatic vinyl compound in this case include styrene, α-methylstyrene, o-methylstyrene, m-methylstyrene, p-methylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene, and 4-(phenylbutyl)styrene. These may be used singly or in combination. Further, the aromatic vinyl compound polymer block may optionally have a structural unit comprising a small amount of other unsaturated monomers. The conjugated diene polymer block is a polymer block formed from one or more conjugated diene compounds such as 1,3-butadiene, chloroprene, isoprene, 2,3-dimethyl-1,3-butadiene, 1,3-pentadiene, 4-methyl-1,3-pentadiene, and 1,3-hexadiene, and in the hydrogenated aromatic vinyl compound/conjugated diene compound block copolymer, a part or all of the unsaturated bond parts in the conjugated diene polymer block are saturated bonds by hydrogenation.

The molecular structure of the aromatic vinyl compound/conjugated diene compound block copolymer and the hydrogenated products thereof may be any of linear, branched, radial, or any combination thereof. Among them, one or more kinds selected from a group consisting of a diblock copolymer in which one aromatic vinyl compound polymer block is linearly bonded to one conjugated diene polymer block, a triblock copolymer in which three polymer blocks are linearly bonded in the order of an aromatic vinyl compound polymer block—a conjugated diene polymer block—an aromatic vinyl compound polymer block, and hydrogenated products thereof are preferably used as the aromatic vinyl compound/conjugated diene compound block copolymer and/or hydrogenated products thereof. Examples include a non-hydrogenated or hydrogenated styrene/butadiene block copolymer, a non-hydrogenated or hydrogenated styrene/isoprene block copolymer, a non-hydrogenated or hydrogenated styrene/isoprene/styrene block copolymer, a non-hydrogenated or hydrogenated styrene/butadiene/styrene block copolymer, and a non-hydrogenated or hydrogenated styrene/isoprene/butadiene/styrene block copolymer.

Further, the α-olefin copolymer, (ethylene and/or propylene)/(α,β-unsaturated carboxylic acid and/or unsaturated carboxylate) copolymer, ionomer, and aromatic vinyl compound/conjugated diene compound block copolymer used as the impact modifier is preferably a polymer modified with an unsaturated compound having at least one selected from the group consisting of a carboxyl group and an acid anhydride group. This is because, by modifying with such a component, a terminal amino group contained in the semi-aromatic polyamide is allowed to react with at least one selected from the group consisting of a carboxyl group and an acid anhydride group contained in the impact modifier, thereby increasing the compatibility of the interface between the phase of the semi-aromatic polyamide and the phase of the impact modifier to improve impact resistance and elongation properties.

Examples of the unsaturated compound having a carboxyl group in the modified polymer modified with an unsaturated compound having at least one selected from the group consisting of a carboxyl group and an acid anhydride group (hereinafter may also be "modified polymer") include α,β-unsaturated carboxylic acids such as acrylic acid, methacrylic acid, maleic acid, fumaric acid, and itaconic acid. Further, examples of the unsaturated compound having an acid anhydride group include a dicarboxylic anhydride having an α,β-unsaturated bond such as maleic anhydride and itaconic anhydride. As the unsaturated compound having at least one selected from the group consisting of a carboxyl group and an acid anhydride group, a dicarboxylic anhydride having an α,β-unsaturated bond is preferred, and maleic anhydride is more preferred.

The content of the carboxyl group and acid anhydride group in the above modified polymer is preferably in the range of 25 to 200 µmol/g, more preferably in the range of 50 to 100 µmol/g. When the content of the functional groups described above is 25 µmol/g or more, the improvement effect of impact resistance is sufficient, and on the other hand, when the content is 200 µmol/g or less, it is possible to avoid a reduction in moldability due to a reduction in the fluidity of the resulting resin composition.

Examples of a modification method with an unsaturated compound having at least one selected from the group consisting of a carboxyl group and an acid anhydride group include a method in which when the above α-olefin copolymer, (ethylene and/or propylene)/(α,β-unsaturated carboxylic acid and/or unsaturated carboxylate) copolymer, ionomer, and aromatic vinyl compound/conjugated diene compound block copolymer (hereinafter also referred to as a "base resin") is produced by addition polymerization, the base resin is copolymerized with the unsaturated compound having a carboxyl group and/or an acid anhydride group; and a method in which the above base resin is grafted with the unsaturated compound having a carboxyl group and/or an acid anhydride group. Among them, it is preferred to modify the above base resin with the unsaturated compound having at least one selected from a carboxyl group and an acid anhydride group by grafting reaction.

Examples of commercially available products of the impact modifier include "Tafmer" (maleic anhydride-modified ethylene-butene copolymer) manufactured by Mitsui Chemicals, Inc.

When an impact modifier is contained in the resin composition constituting the innermost and outermost layers, the content is preferably in the range of 3 to 30 mass %, more preferably in the range of 5 to 20 mass %, based on the resin composition.

(Conductive Filler)

When a conductive filler is contained in the resin composition used for the innermost layer (A) and the outermost layer (B), especially for the innermost layer (A), it is possible to prevent that static electricity occurs due to internal friction of fuel circulating through the inside of the tube or friction with the fuel and tube walls (tube inner wall or tube outer wall) and ignites fuel to cause explosion.

Conductive fillers encompass all fillers added in order to give conductive performance to a resin composition, and examples of conductive fillers include granular, flaky and fibrous fillers, etc.

Examples of granular fillers include carbon black, graphite, etc. Example of flaky fillers include an aluminum flake, a nickel flake, nickel coat mica, etc. Moreover, examples of fibrous fillers include carbon fiber, carbon-coated ceramic fiber, carbon whisker, carbon nanotubes, and metal fibers such as aluminum fiber, copper fiber, brass fiber and stainless steel fiber, etc. Among these, carbon nanotubes and carbon black are preferable.

When a conductive filler is contained in the resin composition, from the viewpoint of obtaining sufficient antistatic performance, as for its content, a surface specific resistance value of the layer containing the conductive filler in the multilayered tube of the present invention is $10^8$ Ω/square or less, preferably $10^6$ Ω/square or less.

Moreover, the content of conductive filler is preferably in the range of 0.5 to 30 mass %, more preferably in the range of 0.5 to 20 mass %, further preferably in the range of 1 to 15 mass %, based on the resin composition.

(Other Fillers)

Examples of other fillers include fibrous fillers such as glass fiber; powder fillers such as calcium carbonate, wollastonite, silica, silica alumina, alumina, titanium dioxide, potassium titanate, magnesium hydroxide, and molybdenum disulfide; and flaky fillers such as hydrotalcite, a glass flake, mica, clay, montmorillonite, and kaolin.

(Nucleating Agent)

The nucleating agent is not particularly limited as long as it is generally used as a nucleating agent of polyamide, and examples include talc, calcium stearate, aluminum stearate, barium stearate, zinc stearate, antimony oxide, magnesium oxide, and any mixture thereof. Among them, talc is preferred because it has a high effect of increasing the crystallization rate of polyamide. The nucleating agent may be treated with a silane coupling agent, a titanium coupling agent, or the like for the purpose of improving compatibility with polyamide.

(Stabilizing Agent to Heat, Light, or Oxygen)

The stabilizing agent to heat, light, or oxygen is not particularly limited as long as it is generally used as a stabilizing agent of polyamide, and examples include a hindered phenol compound, a hindered amine compound, a phenylenediamine compound, a phenol compound, a benzotriazole compound, a benzophenone compound, a phenyl salicylate compound, an epoxy compound, a phosphite compound, a phosphonite compound, a phosphorus compound, a thio compound, a thioether compound, a tin compound, and halogenated metal. Preferably, the stabilizing agent to heat, light, or oxygen is a halide (examples: chloride, bromide, and iodide) of a group I metal of the periodic table (examples: sodium, potassium, and lithium), copper (I) halide (examples: copper (I) chloride, copper (I) bromide, and copper (I) iodide), and a combination of the halide of the group I metal of the periodic table and the copper (I) halide; and the copper (I) halide is more preferred.

(Plasticizer)

The plasticizer is not particularly limited as long as it is generally used as a plasticizer of polyamide, and examples include a benzenesulfonic acid alkylamide compound, a toluenesulfonic acid alkylamide compound, and a hydroxybenzoic acid alkyl ester compound.

(Lubricant)

The lubricant is not particularly limited as long as it is generally used as a lubricant of polyamide, and examples include a higher fatty acid compound, a oxyfatty acid compound, a fatty acid amide compound, an alkylene-bis fatty acid amide compound, a fatty acid lower alcohol ester compound, a metal soap compound, and polyolefin wax. A fatty acid amide compound such as stearamide, palmitamide, methylene-bis-stearylamide, and ethylene-bis-stearylamide is preferred since it is excellent in an external lubricity effect.

(Production Method of Resin Composition)

The production method of the resin composition used for the innermost layer (A) and the outermost layer (B) is not particularly limited but includes, for example, a method in which semi-aromatic polyamide and other components are blended and then melt-kneaded, etc. Any method of blending other components may be used as long as it is possible to homogenously mix with semi-aromatic polyamide resin and, generally, a method of melt-kneading with a single screw extruder, a twin screw extruder, a kneader mixer, a Banbury mixer or the like is adopted. The melt-kneading conditions are not particularly limited but, for example, a method in which melt-kneading is carried out for 1 to 30 minutes in the temperature range of 30 to 50° C. higher than the melting point of the semi-aromatic polyamide is adopted.

The innermost layer (A) and the outermost layer (B) of the multilayered tube for transporting fuel of the present invention has a layer thickness which is not particularly limited, but each layer thickness is preferably in the range of 0.01 to 1 mm, more preferably in the range of 0.02 to 0.7 mm, and further preferably in the range of 0.03 to 0.5 mm. When the layer thickness is 0.01 mm or more, the multilayered tube for transporting fuel is excellent in impact resistance and biodiesel fuel resistance. Further, when the layer thickness of the innermost layer is 1 mm or less, the multilayered tube for transporting fuel is excellent in economic efficiency and flexibility.

The layer thickness of the innermost layer (A) and the outermost layer (B) of the multilayered tube for transporting fuel can be measured from the actual image of the cross section of the tube by observing the cross section of the tube with a microscope.

{Intermediate Layer (C)}

The material constituting the intermediate layer (C) of the multilayered tube for transporting fuel of the present invention is characterized by that a flexural modulus measured according to ISO 178 is 800 MPa or less. A flexural modulus of the intermediate layer (C) is preferably 750 MPa or less, further preferably 600 MPa or less. When a flexural modulus of the intermediate layer (C) is 800 MPa or less, a multilayered tube for transporting fuel is obtained in which its elongation properties are excellent and a crack is hardly generated also when inserted into other members such as a quick connector.

The material constituting the intermediate layer (C) is not particularly limited as long as its flexural modulus is 800 MPa or less, but is preferably a thermoplastic resin composition. Example of the thermoplastic resin includes: aliphatic polyamides such as polycaproamide (polyamide 6), polyhexamethylene adipamide (polyamide 66), polyundecanamide (polyamide 11), polydodecanamide (polyamide 12), and polyhexamethylene dodecamide (polyamide 612); polyolefin resins such as high density polyethylene, medium density polyethylene, low density polyethylene, linear low density polyethylene, ultra high molecular weight polyethylene, polypropylene, an ethylene/propylene copolymer, an ethylene/vinyl acetate copolymer, a saponified ethylene-vinyl acetate copolymer, an ethylene/acrylic acid copolymer, an ethylene/methacrylic acid copolymer, an ethylene/methyl acrylate copolymer, an ethylene/methyl methacrylate copolymer, and an ethylene/ethyl acrylate copolymer; and modified polyolefin resins which are the above polyolefin resins modified with a compound having a carboxyl group such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, and endo-bicyclo-[2.2.1]-5-heptene-2,3-dicarboxylic acid, a metal salt (Na, Zn, K, Ca, and Mg) thereof, an acid anhydride such as maleic anhydride, itaconic anhydride, citraconic anhydride, and endo-bicyclo-[2.2.1]-5-heptene-2,3-dicarboxylic anhydride, and a compound having an epoxy group such as glycidyl acrylate, glycidyl methacrylate, glycidyl itaconate, and glycidyl citraconate, and the like; polyester resins such as polybutylene terephthalate, polyethylene terephthalate (PET), polyethylene isophthalate (PEI), a PET/PEI copolymer, polyarylate, polybutylene naphthalate, polyethylene naphthalate, and liquid crystal polyester; a polyether resin such as polyacetal and polyphenylene oxide; a polysulfone resin such as polysulfone and polyethersulfone; a polythioether resin such as polyphenylene sulfide and polythioether sulfone; a polyketone resin such as polyether ether ketone and polyallyl ether ketone; a polynitrile resin such as polyacrylonitrile, polymethacrylonitrile, an acrylonitrile-styrene copolymer, an acrylonitrile-butadiene-styrene copolymer, and a methacrylonitrile-butadiene-styrene copolymer; a polymethacrylate resin such as polymethyl methacrylate and polyethyl methacrylate; a polyvinyl ester resin such as polyvinyl acetate; a polyvinyl chloride resin such as polyvinylidene chloride, polyvinyl chloride, a vinyl chloride-vinylidene chloride copolymer, and a vinylidene chloride-methyl acrylate copolymer; a cellulose resin such as cellulose acetate and cellulose butyrate; a fluororesin such as polyvinylidene fluoride, polyvinyl fluoride, an ethylene-tetrafluoroethylene copolymer, polychlorotrifluoroethylene, an ethylene-chlorotrifluoroethylene copolymer, a tetrafluoroethylene-hexafluoropropylene copolymer, and a tetrafluoroethylene-hexafluoropropylene-vinylidene fluoride copolymer; a polycarbonate resin; a polyimide resin such as thermoplastic polyimide, polyamideimide, and polyether imide; and a thermoplastic polyurethane resin. These may be used alone, or two or more of these may be used together. Among these, from the viewpoint of heat resistance, aliphatic polyamides, a polyolefin resin, a modified polyolefin resin, polyester resin, and thermoplastic polyurethane resin are preferable, and high-density polyethylene, linear low density polyethylene, polyester resin, and thermoplastic polyurethane resin are more preferable. One of these thermoplastic resins may be used alone, or two or more may be used together. A material which can constitute the intermediate layer (C) other than the thermoplastic resin composition includes, for example, paper, metallic materials, textiles, nonwoven fabrics, etc.

During use of the multilayered tube for transporting fuel of the present invention, decomposed matters of FAME may penetrate to the innermost layer (A) and the outermost layer (B) to be in contact with the intermediate layer (C). When the intermediate layer (C) contains aliphatic polyamide, since the possibility of degradation of aliphatic polyamide by the decomposed mattes of FAME, especially by an acid component, cannot be removed completely, an embodiment in which the intermediate layer (C) does not contain aliphatic polyamide is also preferable.

When the intermediate layer comprises a thermoplastic resin composition, the content of the above-mentioned thermoplastic resin is preferably 40 mass % or more, more preferably 60 mass % or more, further preferably 80 mass % or more, still further preferably 90 mass % or more, based on the thermoplastic resin composition. When the content of the above-mentioned thermoplastic resin is 40 mass % or more, there will be easily obtained the multilayered tube for transporting fuel which is excellent in elongation properties and hardly generates a crack even when inserted into other members such as a quick connector.

When the intermediate layer (C) comprises a thermoplastic resin composition, as long as the advantageous effects of the present invention are not impaired, other components mentioned in the section of the innermost layer (A) and the outermost layer (B) may be contained. When the thermoplastic resin composition contains other components, other components may also be contained at preferably 60 mass % or less, more preferably 40 mass % or less, further preferably 20 mass % or less, and still further preferably 10 mass % or less in total.

The production method of the thermoplastic resin composition is not particularly limited, but includes melt-kneading similar to the production method of the resin composition constituting the innermost layer (A) and the outermost layer (B).

The intermediate layer (C) of the multilayered tube for transporting fuel of the present invention has a layer thickness which is not particularly limited, but each layer thickness is in the range of preferably 0.1 to 2.0 mm, more preferably in the range of 0.2 to 1.5 mm, and further preferably in the range of 0.5 to 1.0 mm. When the layer thickness is 0.1 mm or more, there will be easily obtained the multilayered tube for transporting fuel which is excellent in elongation properties and hardly generates a crack even when inserted into other members such as a quick connector. Moreover, when the layer thickness of the innermost layer is 2.0 mm or less, the multilayered tube for transporting fuel is excellent in economic efficiency.

The layer thickness of the intermediate layer (C) of the multilayered tube for transporting fuel can be measured from the actual image of the cross section of the tube by observing the cross section of the tube with a microscope.

{Other Layers}

The multilayered tube for transporting fuel of the present invention may further comprise other layers in addition to the innermost layer (A), the outermost layer (B) and the intermediate layer (C).

As the materials constituting other layers, the same materials as those illustrated as a material constituting the innermost layer (A), the outermost layer (B) and the intermediate layer (C) can be used. Among them, other layers preferably comprise at least one layer having barrier properties to each component in fuel (hereinafter also referred to as an "intermediate barrier layer"). From this point of view, the material constituting the intermediate barrier layer is preferably at least one material selected from the group consisting of a saponified ethylene-vinyl acetate copolymer (EVOH), the fluororesin, and the semi-aromatic polyamide, more preferably at least one material selected from the group consisting of EVOH and semi-aromatic polyamide.

The total layer thickness of the intermediate barrier layer is preferably in the range of 0.1 to 1.0 mm, more preferably in the range of 0.15 to 0.5 mm, from the viewpoint of imparting barrier properties. Further, the intermediate barrier layer may comprise two layers or more, and the "total layer thickness" in this case means the sum of the layer thicknesses of the intermediate barrier layers.

Further, an adhesive layer may also be contained between the layers in order to improve interlaminar adhesion properties. The material constituting the adhesive layer can be arbitrarily selected in consideration of the adhesion with each layer in contact with the adhesive layer, and the like. Further, the intermediate barrier layer may have a function as the adhesive layer. The adhesive layer preferably has a layer thickness per one layer in the range of 0.01 to 0.3 mm, more preferably in the range of 0.03 to 0.2 mm. When the layer thickness of the adhesive layer is in the above-mentioned range, the elongation properties given to the multilayered tube for transporting fuel of the present invention by existence of the intermediate layer (C) is not be deteriorated at all. The adhesive layer may comprise two layers or more.

For a material constituting an adhesive layer, at least one selected from the group consisting of modified polyolefin resin and polyester resin is preferable. When modified polyolefin resin is used as a material constituting the intermediate layer from the viewpoint of improving adhesion to the intermediate layer in contact with the adhesive layer, it is more preferable to use modified polyolefin resin as a material constituting the adhesive layer, and when polyester resin is used as the intermediate layer, it is more preferable to use polyester resin as a material constituting the adhesive layer.

{Constitution of Multilayered Tube for Transporting Fuel}

The number of the layers constituting the multilayered tube for transporting fuel of the present invention is preferably three to seven layers, more preferably three to six layers, from the viewpoint of the advantageous effects of the present invention of being excellent in biodiesel fuel resistance, hardly generating a crack also when inserted into other members, and being excellent in elongation properties, and the productivity.

Examples of preferred layer constitution of the multilayered tube for transporting fuel include the following constitutions.

Note that, in the following descriptions, the notation of, for example, (a)/(b)/(c) shows that layers are sequentially laminated in the order of (a), (b), and (c) from the innermost layer of the multilayered tube for transporting fuel.

(1) Three-layer structure of innermost layer/intermediate layer/outermost layer (2) Four layer structure of innermost layer/adhesive layer/intermediate layer/outermost layer, innermost layer/intermediate layer/adhesive layer/outermost layer, innermost layer/intermediate barrier layer/intermediate layer/outermost layer, or innermost layer/intermediate layer/intermediate barrier layer/outermost layer (3) Five layer structure of innermost layer/adhesive layer 1/intermediate layer/adhesive layer 2/outermost layer, innermost layer/intermediate barrier layer 1/intermediate layer/intermediate barrier layer 2/outermost layer, innermost layer/adhesive layer/intermediate layer/intermediate barrier layer/outermost layer, or innermost layer/intermediate barrier layer/adhesive layer/intermediate layer/outermost layer (4) Six layer structure of innermost layer/adhesive layer 1/intermediate barrier layer/intermediate layer/adhesive layer 2/outermost layer, innermost layer/adhesive layer 1/intermediate layer/intermediate barrier layer/adhesive layer 2/outermost layer, innermost layer/intermediate barrier layer 1/adhesive layer/intermediate layer/intermediate barrier layer 2/outermost layer, innermost layer/intermediate barrier layer 1/intermediate layer/adhesive layer/intermediate barrier layer 2/outermost layer, innermost layer/intermediate barrier layer 1/intermediate barrier layer 2/intermediate layer/adhesive layer/outermost layer, or innermost layer/intermediate barrier layer 1/intermediate barrier layer 2/intermediate barrier layer 3/intermediate layer/outermost layer Among them, the layer constitution of innermost layer/intermediate layer/outermost layer and innermost layer/adhesive layer 1/intermediate layer/adhesive layer 2/outermost layer is preferable. The resin composition constituting the innermost layer and the outermost layer may have the same or different composition, and the same composition is preferable because of hardly generating a crack also when inserted into other members, and being excellent in elongation properties.

The multilayered tube for transporting fuel of the present invention may have a wave-shaped area. The wave-shaped area is an area formed in a wave shape, a bellows shape, an accordion shape, a corrugated shape, etc. The wave-shaped area may be formed over the whole of the multilayered tube for transporting fuel or may be contained partially. With this wave-shaped area, an impact absorption property is increased, attachment properties become easy, and it becomes easy to form into a shape of L letter and U letter, etc. by bending processing.

In particular, when the multilayered tube for transporting fuel of the present invention is used for the fuel pump module mentioned later, the tube has a corrugated shape in many cases.

The outer and inner diameters of the multilayered tube for transporting fuel of the present invention are not particularly limited. In consideration of the flow rate and pressure of fuel, it may be optionally selected from, for example, the ranges of the outer diameter of 4 to 200 mm and the inner diameter of 2 to 160 mm.

{Method for Producing Multilayered Tube for Transporting Fuel}

The production of the multilayered tube for transporting fuel of the present invention can be performed using a molding method such as injection molding and extrusion molding. Further, these molding methods can also be employed in combination.

Examples of extrusion molding include a method including melt extruding with extruders corresponding to the number of layers or the number of materials, and simultaneously laminating the extruded materials in or outside a die (co-extrusion method); and a method including producing single-layer tubes in advance, successively arranging them outside, and integrating their resins optionally using an adhesive to laminate them (coating method). The multilayered tube for transporting fuel of the present invention is preferably produced by a co-extrusion method.

When a tube having the wave-shaped area is produced, after a straight tube is first molded, mold-shaping is subsequently performed to make a predetermined wave-shaped form.

[Fuel Pump Module]

The multilayered tubes for transporting fuel of the present invention is used in the environment in which both the innermost layer (A) and the outermost layer (B) are contacted with biodiesel fuel. As long as it is used in the above-mentioned environment, the application is not particularly limited, but it is typically used for various types of piping of a fuel pump module accommodated in a fuel tank.

A fuel pump module is accommodated in a fuel tank of automobiles and the like and plays a role of supplying fuel to an internal-combustion engine. A typical fuel pump module comprises a fuel pump, a filter, a tube for transporting fuel (hose) and a flange, and the flange functions as a lid which blocks the opening of a fuel tank. The outside of this flange, i.e., the portion exposed to the outside of the fuel tank is equipped with a discharge pipe discharging fuel to an internal-combustion engine and a return pipe to which a surplus of fuel flows in. The fuel in the fuel tank is sucked and pressurized with a fuel pump and then discharged from the discharge part of the flange through the tube for transporting fuel. Moreover, the surplus of fuel flowed in through the return pipe is typically returned to the fuel tank through another tube for transporting fuel.

Since these tubes for transporting fuel are immersed in fuel in the fuel tank, when biodiesel fuel is used, both the inside and outsides of the tube for transporting fuel are directly contacted with biodiesel fuel, and there is a risk that a crack due to degradation may occur. In the fuel pump module of the present invention, since the multilayered tube for transporting fuel of the present invention is used as the above-mentioned tube for transporting fuel, even in the environment in which both the innermost layer (A) and the outermost layer (B) of the multilayered tube for transporting fuel are contacted with biodiesel fuel, the above problem can be solved.

Examples of a structure of the fuel pump module of the present invention include, for example, the ones disclosed in JP 2004-28050 A and JP 2008-88824 A and the like, but there is no particular limitation as long as it has a structure in which at least a part of the multilayered tube for transporting fuel is immersed in fuel in the fuel tank.

EXAMPLES

Hereinafter, the present invention will be described in more detail by way of Examples and Comparative Example, but the present invention is not limited to Examples to be described below.

Note that each evaluation in Examples and Comparative Example was performed in accordance with the methods shown below.

(Amount of Heat of Crystal Fusion and Glass Transition Temperature)

With use of a differential scanning calorimetric analysis equipment (DSC 822) manufactured by Mettler Toledo International Inc., about 10 mg of a sample was heated from 30° C. to a 30° C. higher temperature than the melting point at a rate of 10° C./min. under nitrogen atmosphere. A value of the area of the fusion peak which appeared during heating divided by the sample weight was defined as the amount of heat of crystal fusion (ΔHm). Thereafter, after the sample was fused completely while keeping at a 30° C. higher temperature than the melting point for 10 minutes, the sample was cooled to 40° C. at a rate of 10° C./min and held at 40° C. for 10 minutes. When heated to a 30° C. higher temperature than the melting point at a rate of 10° C./min again, the middle point where DSC curve changed in the shape of stairs was decided as a glass transition temperature (Tg).

(Flexural Modulus)

An ISO multi-purpose test piece A type dumbbell was prepared from the resin composition (pellet) used for the intermediate layer by using an injection molding machine manufactured by Toshiba Machine Co., Ltd. (mold clamping force: 80 tons, screw diameter: ϕ32 mm) under conditions of a cylinder temperature of 20 to 30° C. higher than the melting point and a mold temperature of 20 to 30° C. higher than the glass transition temperature and using a T-runner mold. A rectangular parallelepiped test piece (size: length×width×thickness=80 mm×10 mm×4 mm) was cut out from the above ISO multi-purpose test piece A type dumbbell as a test piece for evaluation of flexural modulus.

With use of the test piece, a flexural modulus was measured according to ISO 178 with Autograph (manufactured by Shimadzu Corporation) under conditions of 23° C. and 50% RH.

Production of Polyamide 9T Resin Composition (PA9T)

Productive Example 1

Semi-aromatic polyamide was used which comprises terephthalic acid units, 1,9-nonanediamine units and 2-methyl 1,8-octanediamine units (1,9-nonanediamine unit: 2-methyl 1,8-octanediamine unit=50:50 (molar ratio)) and which has an amide group concentration of 0.118, an intrinsic viscosity [η](measured at 30° C. in concentrated sulfuric acid) of 1.30 dl/g, a melting point of 265° C., and a terminal blocking ratio of 90% or more (terminal blocking agent: benzoic acid). The semi-aromatic polyamide, a maleic anhydride modified ethylene-butene copolymer ("Tafmer MH7020" manufactured by Mitsui Chemicals, Inc.) as an impact modifier, and copper (I) iodide and potassium iodide as a stabilizer were premixed at a molar ratio of polyamide:maleic anhydride modified ethylene-butene copolymer:copper (I) iodide:potassium iodide=100:5.3:0.046:0.38. Thereafter, the resulting mixture was supplied to a twin screw extruder (manufactured by Pla Giken Co., Ltd) and melt-kneaded under conditions at a cylinder temperature of 300 to 320° C. to obtain a polyamide resin composition (content of semi-aromatic polyamide 95 mass %) as pellets. Hereinafter, this resin composition may also be referred to as a "PA9T."

The resin compositions constituting the innermost layer, the outermost layer, the intermediate layer and the adhesive layer which were used in each Example and the like are shown below.
(Polyamide 9T Resin Composition (PA9T))
PA9T (amide group concentration: 0.118) obtained in Productive Example 1 was used.
(Polyamide 10T Resin Composition (PA10T))
VESTAMID HT PLUS M-3000 (amide group concentration: 0.111) manufactured by Daicel-Evonik Ltd. was used.
(Polyamide 11 Resin Composition (PA11)
RILSAN B series BESN P20TL manufactured by Arkema K.K was used.
(Polyamide 12 Resin Composition (PA12))
RILSAN A series AESN P40TL manufactured by Arkema K.K was used.
(High-Density Polyethylene Resin Composition (HDPE))
NOVATEC HD series HE 122R manufactured by Japan Polyethylene Corporation was used.
(Linear Low-Density Polyethylene Resin Composition (LLDPE))
NOVATEC LL series UE320 manufactured by Japan Polyethylene Corporation was used.
(Polyester Resin Composition (Polyester))
HYTREL 6377 (polyester) manufactured by Du Pont-Toray Co., Ltd. was used.

(Thermoplastic Polyurethane Composition (Thermoplastic Polyurethane))
HYTREL 5557 (TPU-ester) manufactured by Du Pont-Toray Co., Ltd. was used.
(Adhesive Resin)
When HDPE or LLDPE was used for the intermediate layer, UBond F1100 which is a modified polyolefin adhesive resin and manufactured by Ube Industries, Ltd. was used. When polyester was used for the intermediate layer, PRIMALLOY AP series GQ430 which is a polyester adhesive resin and manufactured by Mitsubishi Chemical Corporation was used.

Production of Multilayered Tube

Productive Example 2-1

With use of PA9T and PA11 shown above, PA9T was melted at an extrusion temperature of 310° C. while PA11 was melted at an extrusion temperature of 230° C., which were separately melted with a three-layered tube molding machine "Plabor" manufactured by Research Laboratory of Plastics Technology Co., Ltd. The discharged molten resins were joined with an adapter and molded into a laminated tube-like body. Subsequently, cooling with a sizing die controlling the size was carried out and take-over was carried out to obtain a multilayered tube having the innermost layer (A) formed of PA9T, the intermediate layer (C) formed of PA11 and the outermost layer (B) formed of PA9T as (A)/(C)/(B)=0.125/0.75/0.125 mm and an inner diameter of 6 mm and an outer diameter of 8 mm.

Productive Example 2-2

The same method as Productive example 2-1 was performed except that, with use of PA9T and PA12 shown above, PA9T was melted at an extrusion temperature of 310° C. while PA12 was melted at an extrusion temperature of 240° C., which were separately melted with a three-layered tube molding machine "Plabor" manufactured by Research Laboratory of Plastics Technology Co., Ltd., to thereby obtain a multilayered tube having the innermost layer (A) formed of PA9T, the intermediate layer (C) formed of PA12 and the outermost layer (B) formed of PA9T as (A)/(C)/(B)=0.125/0.75/0.125 mm and an inner diameter of 6 mm and an outer diameter of 8 mm.

Productive Example 2-3

With use of PA9T, HDPE and an adhesive resin shown above, PA9T was melted at an extrusion temperature of 310° C. while HDPE was melted at an extrusion temperature of 190° C. and the adhesive resin was melted at an extrusion temperature of 190° C., which were separately melted with a five-layered tube molding machine "Plabor" manufactured by Research Laboratory of Plastics Technology Co., Ltd. The discharged molten resins were joined with an adapter and molded into a laminated tube-like body. Subsequently cooling with a sizing die controlling the size was carried out and take-over was carried out to obtain a multilayered tube having the innermost layer (A) formed of PA9T, a layer (D-1) formed of modified polyolefin adhesive resin, the intermediate layer (C) formed of HDPE, a layer (D-2) formed of modified polyolefin adhesive resin and the outermost layer (B) formed of PA9T as (A)/(D-1)/(C)/(D-2)/

(B)=0.125/0.10/0.55/0.10/0.125 mm and an inner diameter of 6 mm and an outer diameter of 8 mm.

Productive Example 2-4

The same method as Productive example 2-3 was performed except that, with use of PA9T, LLDPE and an adhesive resin shown above, PA9T was melted at an extrusion temperature of 310° C. while LLDPE was melted at an extrusion temperature of 170° C. and the adhesive resin was melted at an extrusion temperature of 190° C., which were separately melted with a five-layered tube molding machine "Plabor" manufactured by Research Laboratory of Plastics Technology Co., Ltd., to thereby obtain a multilayered tube having the innermost layer (A) formed of PA9T, a layer (D-1) formed of modified polyolefin adhesive resin, the intermediate layer (C) formed of LLDPE, a layer (D-2) formed of modified polyolefin adhesive resin and the outermost layer (B) formed of PA9T as (A)/(D-1)/(C)/(D-2)/(B)=0.125/0.10/0.55/0.10/0.125 mm and an inner diameter of 6 mm and an outer diameter of 8 mm.

Productive Example 2-5

The same method as Productive example 2-3 was performed except that, with use of PA9T, polyester and an adhesive resin shown above, PA9T was melted at an extrusion temperature of 300° C. while polyester was melted at an extrusion temperature of 260° C. and the adhesive resin was melted at an extrusion temperature of 190° C., which were separately melted with a five-layered tube molding machine "Plabor" manufactured by Research Laboratory of Plastics Technology Co., Ltd., to thereby obtain a multilayered tube having the innermost layer (A) formed of PA9T, a layer (D-1) formed of polyester adhesive resin, the intermediate layer (C) formed of polyester, a layer (D-2) formed of polyester adhesive resin and the outermost layer (B) formed of PA9T as (A)/(D-1)/(C)/(D-2)/(B)=0.125/0.10/0.55/0.10/0.125 mm and an inner diameter of 6 mm and an outer diameter of 8 mm.

Productive Example 2-6

The same method as Productive example 2-1 was performed except that, with use of PA9T and thermoplastic polyurethane shown above, PA9T was melted at an extrusion temperature of 310° C. while thermoplastic polyurethane was melted at an extrusion temperature of 260° C., which were separately melted with a three-layered tube molding machine "Plabor" manufactured by Research Laboratory of Plastics Technology Co., Ltd., to thereby obtain a multilayered tube having the innermost layer (A) formed of PA9T, the intermediate layer (C) formed of thermoplastic polyurethane and the outermost layer (B) formed of PA9T as (A)/(C)/(B)=0.125/0.75/0.125 mm and an inner diameter of 6 mm and an outer diameter of 8 mm.

Productive Example 2-7

The same method as Productive example 2-1 was performed except that, with use of PA10T and PA11 shown above, PA10T was melted at an extrusion temperature of 330° C. while PA11 was melted at an extrusion temperature of 230° C., which were separately melted with a three-layered tube molding machine "Plabor" manufactured by Research Laboratory of Plastics Technology Co., Ltd., to thereby obtain a multilayered tube having the innermost layer (A) formed of PA10T, the intermediate layer (C) formed of PA11 and the outermost layer (B) formed of PA10T as (A)/(C)/(B)=0.125/0.75/0.125 mm and an inner diameter of 6 mm and an outer diameter of 8 mm.

Productive Example 2-8

With use of PA9T and PA11 shown above, PA9T was melted at an extrusion temperature of 310° C. while PA11 was melted at an extrusion temperature of 230° C., which were separately melted with a two-layered tube molding machine "Plabor" manufactured by Research Laboratory of Plastics Technology Co., Ltd. The discharged molten resins were joined with an adapter and formed into a laminated tube-like body. Subsequently, cooling with a sizing die controlling the size was carried out and take-over was carried out to obtain a multilayered tube having the innermost layer (A) formed of PA9T and the outermost layer (B) formed of PA11 as (A)/(B)=0.25/0.75 mm and an inner diameter of 6 mm and an outer diameter of 8 mm.

Productive Example 2-9

The same method as Productive example 2-8 was performed except that, with use of PA9T and PA12 shown above, PA9T was melted at an extrusion temperature of 310° C. while PA12 was melted at an extrusion temperature of 240° C., which were separately melted with a two-layered tube molding machine "Plabor" manufactured by Research Laboratory of Plastics Technology Co., Ltd., to thereby obtain a multilayered tube having the innermost layer (A) formed of PA9T and the outermost layer (B) formed of PA12 as (A)/(B)=0.25/0.75 mm and an inner diameter of 6 mm and an outer diameter of 8 mm.

Productive Example 2-10

The same method as Productive example 2-1 was performed except that, with use of PA9T, an adhesive resin and HDPE shown above, PA9T was melted at an extrusion temperature of 310° C. while the adhesive resin was melted at an extrusion temperature of 190° C. and HDPE was melted at an extrusion temperature of 190° C., which were separately melted with a three-layered tube molding machine "Plabor" manufactured by Research Laboratory of Plastics Technology Co., Ltd., to thereby obtain a multilayered tube having the innermost layer (A) formed of PA9T, a layer (D) formed of modified polyolefin adhesive resin and the outermost layer (B) formed of HDPE as (A)/(D)/(B)=0.25/0.10/0.65 mm and an inner diameter of 6 mm and an outer diameter of 8 mm.

Productive Example 2-11

The same method as Productive example 2-1 was performed except that, with use of PA9T, an adhesive resin and LLDPE shown above, PA9T was melted at an extrusion temperature of 310° C. while the adhesive resin was melted at an extrusion temperature of 190° C. and LLDPE was melted at an extrusion temperature of 170° C., which were separately melted with a three-layered tube molding machine "Plabor" manufactured by Research Laboratory of Plastics Technology Co., Ltd., to thereby obtain a multilayered tube having the innermost layer (A) formed of PA9T, a layer (D) formed of modified polyolefin adhesive resin and the outermost layer (B) formed of LLDPE as (A)/(D)/(B)=0.25/0.10/0.65 mm and an inner diameter of 6 mm and an outer diameter of 8 mm.

Productive Example 2-12

The same method as Productive example 2-1 was performed except that, with use of PA9T, an adhesive resin and polyester shown above, PA9T was melted at an extrusion temperature of 310° C. while the adhesive resin was melted at an extrusion temperature of 190° C. and polyester was melted at an extrusion temperature of 260° C., which were separately melted with a three-layered tube molding machine "Plabor" manufactured by Research Laboratory of Plastics Technology Co., Ltd., to thereby obtain a multilayered tube having the innermost layer (A) formed of PA9T, a layer (D) formed of polyester adhesive resin and the outermost layer (B) formed of polyester as (A)/(D)/(B)=0.25/0.10/0.65 mm and an inner diameter of 6 mm and an outer diameter of 8 mm.

Productive Example 2-13

The same method as Productive example 2-8 was performed except that, with use of PA9T and thermoplastic polyurethane shown above, PA9T was melted at an extrusion temperature of 310° C. while thermoplastic polyurethane was melted at an extrusion temperature of 260° C., which were separately melted with a two-layered tube molding machine "Plabor" manufactured by Research Laboratory of Plastics Technology Co., Ltd., to thereby obtain a multilayered tube having the innermost layer (A) formed of PA9T and the outermost layer (B) formed of thermoplastic polyurethane as (A)/(B)=0.25/0.75 mm and an inner diameter of 6 mm and an outer diameter of 8 mm.

Examples 1 to 7, Comparative Examples 1 to 6

Using the multilayered tube obtained in the above-mentioned Productive examples 2-1 to 2-13, evaluation was performed with the following crack test.

Examples 1 to 7 correspond to above-mentioned Productive examples 2-1 to 2-7, and Comparative Examples 1 to 6 correspond to above-mentioned Productive example 2-8 to 2-13.

(Crack Test)

Each multilayered tube cut to a length of 200 mm was immersed in biodiesel fuel (SME B30 with ULSD) containing 30 mass % of SME and manufactured by Gage Products Company and was kept at 90° C. The tubes were visually checked for every constant period of time, and the time when a crack occurred was recorded. The results are shown in Table 1.

TABLE 1

| | | Innermost layer | | | Intermediate layer | | | | Crack | |
|---|---|---|---|---|---|---|---|---|---|---|
| | | Resin composition | ΔHm (J/g) | Tg (° C.) | Adhesive layer | Resin composition | Flexural modulus (MPa) | Adhesive layer | Outermost layer Resin composition | Occurrence | Occurrence time (hrs) |
| Example | 1 | PA9T | 60 | 125 | — | PA11 | 450 | — | PA9T | None | >3000 |
| | 2 | | | | — | PA12 | 400 | — | (The same as | None | >3000 |
| | 3 | | | | Existing | HDPE | 710 | Existing | Innermost layer) | None | >3000 |
| | 4 | | | | Existing | LLDPE | 330 | Existing | | None | >3000 |
| | 5 | | | | Existing | Polyester | 350 | Existing | | None | >3000 |
| | 6 | | | | — | Thermoplastic polyurethane | 235 | — | | None | >3000 |
| | 7 | PA10T | 65 | 125 | — | PA11 | 450 | — | PA10T (The same as Innermost layer) | None | >3000 |
| Comparative Example | 1 | PA9T | 60 | 125 | — | — | — | — | PA11 | Observed | 600 |
| | 2 | | | | — | — | — | — | PA12 | Observed | 430 |
| | 3 | | | | Existing | — | — | — | HDPE | Observed | 750 |
| | 4 | | | | Existing | — | — | — | LLDPE | Observed | 490 |
| | 5 | | | | Existing | — | — | — | Polyester | Observed | 190 |
| | 6 | | | | — | — | — | — | Thermoplastic polyurethane | Observed | 210 |

From the results shown in Table 1, in the multilayered tube for transporting fuel of the present invention, resistance to biodiesel fuel is largely improved as compared with other tubes. Moreover, with use of the intermediate layer (C) having a flexural modulus less than a certain value, elongation properties is more excellent and a crack is more hardly generated even when inserted into other members as compared with the case of using, for example, a monolayer tube of semi-aromatic polyamide, and thus the multilayered tube for transporting fuel of the present invention is suitably used as a tube for transporting fuel with which a fuel pump module is equipped.

The invention claimed is:

1. A multilayered tube, comprising an innermost layer (A), an outermost layer (B), and an intermediate layer (C), wherein:
   the innermost layer (A) and the outermost layer (B) comprise a resin composition comprising 40 mass % or more of semi-aromatic polyamide; and
   a flexural modulus of a material constituting the intermediate layer (C) measured according to ISO 178 is 800 MPa or less.

2. The multilayered tube according to claim 1, wherein a ratio of the number of amide groups to the number of carbon atoms of the semi-aromatic polyamide is 0.070 to 0.170.

3. The multilayered tube according to claim 1, wherein an amount of heat of crystal fusion (ΔHm) of the semi-aromatic polyamide is 30 J/g or more.

4. The multilayered tube according to claim 1, wherein a glass transition temperature of the semi-aromatic polyamide is 80° C. or more.

5. The multilayered tube according to claim 1, wherein the semi-aromatic polyamide comprises:
- a dicarboxylic acid unit comprising 50 to 100 mol % of at least one selected from the group consisting of a terephthalic acid unit and a naphthalene dicarboxylic acid unit; and
- a diamine unit comprising 60 to 100 mol % of an aliphatic diamine unit having 4 to 18 carbon atoms.

6. The multilayered tube according to claim 1, wherein the intermediate layer (C) does not comprise an aliphatic polyamide.

7. The multilayered tube according to claim 1, wherein the biodiesel fuel is biodiesel fuel comprising 20 mass % or more of FAME.

8. A method for transporting fuel, comprising transporting fuel with a multilayered tube comprising an innermost layer (A), an outermost layer (B), and an intermediate layer (C), wherein:
- the innermost layer (A) and the outermost layer (B) comprise a resin composition comprising 40 mass % or more of semi-aromatic polyamide;
- a flexural modulus of a material constituting the intermediate layer (C) measured according to ISO 178 is 800 MPa or less; and
- the multilayered tube is used in an environment in which both the innermost layer (A) and the outermost layer (B) are contacted with biodiesel fuel.

9. A fuel pump module comprising the multilayered tube according to claim 1, wherein both the innermost layer (A) and the outermost layer (B) of the multilayered tube are contacted with biodiesel fuel.

10. The fuel pump module according to claim 9, wherein the biodiesel fuel is biodiesel fuel comprising 20 mass % or more of FAME.

11. A method for transporting fuel, comprising transporting fuel with a fuel pump module comprising the multilayered tube according to claim 1, wherein the fuel pump module is used in an environment in which both the innermost layer (A) and the outermost layer (B) of the multilayered tube are contacted with biodiesel fuel.

* * * * *